(12) United States Patent
Koshikawa et al.

(10) Patent No.: US 10,647,284 B2
(45) Date of Patent: May 12, 2020

(54) DRIVER AIRBAG AND DRIVER AIRBAG DEVICE

(71) Applicant: JOYSON SAFETY SYSTEMS JAPAN K.K., Tokyo (JP)

(72) Inventors: Kimihiro Koshikawa, Shiga (JP); Teruhiko Hiruta, Shiga (JP); Hiromichi Yoshikawa, Shiga (JP)

(73) Assignee: JOYSON SAFETY SYSTEMS JAPAN K.K., Tokyo (JP)

( * ) Notice: Subject to any disclaimer, the term of this patent is extended or adjusted under 35 U.S.C. 154(b) by 203 days.

(21) Appl. No.: 15/864,321

(22) Filed: Jan. 8, 2018

(65) Prior Publication Data
US 2018/0201219 A1 Jul. 19, 2018

(30) Foreign Application Priority Data
Jan. 19, 2017 (JP) .................................. 2017-007600

(51) Int. Cl.
| | |
|---|---|
| *B60R 21/231* | (2011.01) |
| *B60R 21/237* | (2006.01) |
| *B60R 21/235* | (2006.01) |
| *B60R 21/203* | (2006.01) |

(52) U.S. Cl.
CPC .......... *B60R 21/231* (2013.01); *B60R 21/235* (2013.01); *B60R 21/237* (2013.01); *B60R 21/203* (2013.01); *B60R 2021/23538* (2013.01)

(58) Field of Classification Search
CPC ... B60R 21/203; B60R 21/231; B60R 21/237; B60R 21/235; B60R 2021/23533; B60R 2021/23538
See application file for complete search history.

(56) References Cited

U.S. PATENT DOCUMENTS

| | | | | |
|---|---|---|---|---|
| 4,235,453 | A | * 11/1980 | Lawson | ................. B60R 21/237 280/743.1 |
| 5,803,495 | A | * 9/1998 | Jackson | ............... B60R 21/2342 280/731 |
| 6,092,839 | A | * 7/2000 | Nagano | ................. B60R 21/237 280/743.1 |
| 8,678,429 | B2 | 3/2014 | Nagasawa et al. | |
| 2003/0030255 | A1* | 2/2003 | Igawa | .................... B60R 21/206 280/730.1 |

(Continued)

FOREIGN PATENT DOCUMENTS

| | | |
|---|---|---|
| CN | 102849017 A | 1/2013 |
| CN | 103879369 A | 6/2014 |

(Continued)

*Primary Examiner* — Frank B Vanaman
(74) *Attorney, Agent, or Firm* — Foley & Lardner LLP

(57) ABSTRACT

A driver airbag 1 is formed by sewing a front panel 2 and a rear panel 3 together. The rear panel 3 has a horizontal first tuck portion 21, a second tuck portion 22 extending from a right upper side toward a left lower side, and a third tuck portion 23 extending from a left upper side toward a right lower side. The tuck portion 22 and the tuck portion 23 intersect in an upper part of the rear panel 3. Since most of the second and third tuck portions 22, 23 are located in an upper half section of the rear panel 3, the upper part of the driver airbag 1 has a larger thickness than that of a lower part when the driver airbag 1 is inflated completely.

13 Claims, 4 Drawing Sheets

(56) References Cited

U.S. PATENT DOCUMENTS

| | | | | |
|---|---|---|---|---|
| 2006/0249943 A1* | 11/2006 | Bauer | ................... | B60R 21/231 |
| | | | | 280/743.2 |
| 2013/0001934 A1 | 1/2013 | Nagasawa et al. | | |
| 2013/0093171 A1* | 4/2013 | Eckert | ................... | B60R 21/203 |
| | | | | 280/743.2 |
| 2017/0210331 A1* | 7/2017 | Komatsu | ............... | B60R 21/237 |
| 2018/0229686 A1* | 8/2018 | Hepp | .................. | B60R 21/237 |

FOREIGN PATENT DOCUMENTS

| | | | |
|---|---|---|---|
| CN | 104276127 A | 1/2015 | |
| CN | 102849017 B | 12/2016 | |
| CN | 103879369 B | 4/2017 | |
| DE | 10 2013 114 029 A1 | 6/2014 | |
| DE | 10 2014 009 922 A1 | 1/2015 | |
| JP | 11-020586 A | 1/1999 | |
| JP | 2003-276546 A | 10/2003 | |
| JP | 3922764 B2 | 5/2007 | |
| JP | 3991739 B2 | 10/2007 | |
| JP | 2007-302192 A | 11/2007 | |
| JP | 2010-132215 A | 6/2010 | |
| JP | 2013-014176 A | 1/2013 | |
| JP | 2013-071677 * | 4/2013 | ........... B60R 21/237 |
| JP | 2014-094651 A | 5/2014 | |
| JP | 2014-121965 A | 7/2014 | |
| JP | 5572597 B2 | 8/2014 | |
| JP | 2015-013515 A | 1/2015 | |
| JP | 2015-116912 A | 6/2015 | |
| JP | 6017270 B2 | 10/2016 | |
| JP | 6085470 B2 | 2/2017 | |
| JP | 6120705 B2 | 4/2017 | |

\* cited by examiner

US 10,647,284 B2

DRIVER AIRBAG AND DRIVER AIRBAG DEVICE

CROSS REFERENCE TO RELATED APPLICATIONS

This application claims the benefit of Japanese Patent Application No. 2017-007600, filed on Jan. 19, 2017, the contents of which are hereby incorporated by reference in their entirety.

TECHNICAL FIELD

The present invention relates to an airbag and an airbag device that restrain an occupant in a collision of an automobile, and more particularly, to an air bag and an airbag device for a driver. In this description, the upper, lower, left, and right sides of the driver airbag refer to the upper, lower, left, and right sides of the driver airbag when the driver airbag installed in a steering wheel in a vehicle straight running state is inflated.

BACKGROUND ART

A driver airbag device installed in a steering wheel is configured so that an inflator (gas generator) is started to generate gas in case of an emergency, such as a vehicle collision, and the gas is supplied to an airbag to deploy the airbag between the steering wheel and a driver.

There is known a driver airbag in which peripheral edges of a front panel and a rear panel are sewn together.

PTL (patent literature) 1 describes a driver airbag that is installed in a steering wheel and is thicker in an upper part than in a lower part in an inflated state.

PTL 1: Japanese Unexamined Patent Application Publication No. 2003-276546

In the driver airbag of PTL 1, the front panel and the rear panel are connected with a belt-shaped intermediate panel interposed therebetween by sewing or the like. Accordingly, the driver airbag of PTL 1 requires three panels consisting of the front panel, the rear panel, and the intermediate panel.

SUMMARY OF INVENTION

An object of the present invention is to provide a driver airbag that is structured without using an intermediate panel, and is thicker in an upper part than in a lower part when the airbag is inflated completely on a steering wheel.

A driver airbag of the present invention comprises a front panel and a rear panel connected at peripheral edges thereof. The rear panel includes a tuck portion. The tuck portion is disposed only in an upper part of the rear panel, or more tuck portions are disposed in the upper part of the rear panel than in a lower part of the rear panel.

A driver airbag device of the present invention comprises the driver airbag according the present invention and an inflator.

In an embodiment of the driver airbag according to the present invention, the tuck portions include a first tuck portion extending in a right-left direction, a second tuck portion extending from a right upper side toward a left lower side, and a third tuck portion extending from a left upper side toward a right lower side.

In an embodiment of the driver airbag according to the present invention, the second tuck portion and the third tuck portion intersect in an upper half section of the rear panel.

Advantageous Effects of Invention

The rear panel of the driver airbag according to the present invention is provided with the tuck portions only in the upper part of the rear panel or is provided with more tuck portions in the upper part than in the lower part before inflation. The tuck portions are deployed so that the driver airbag is thicker in the upper part than in the lower part when the airbag is inflated completely. The driver airbag of the present invention does not need an intermediate panel.

DESCRIPTION OF EMBODIMENTS

Figure 1:
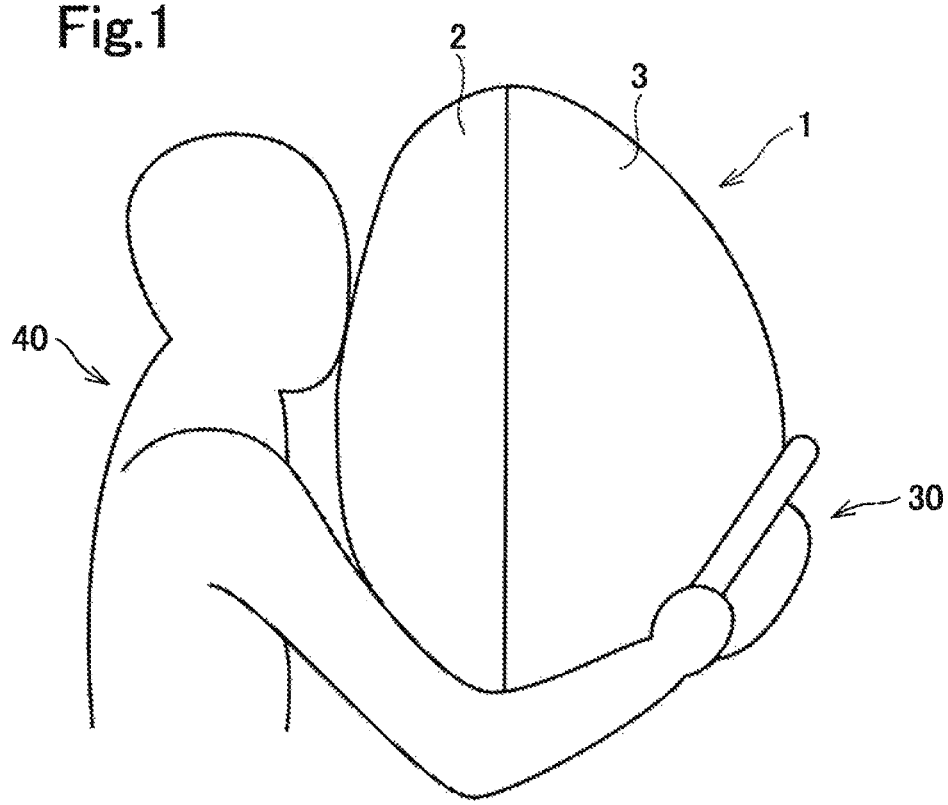
FIG. 1 is a side view of a driver airbag according to an embodiment when the airbag is inflated completely.
Figure 2:
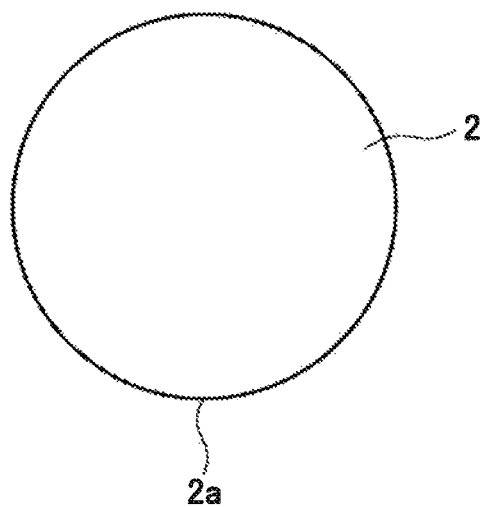
FIG. 2 is a plan view of a front panel of the driver airbag according to the embodiment.

An embodiment will be described below with reference to the drawings.

FIGS. 1 to 5c illustrate a driver airbag 1 according to an embodiment. This driver airbag 1 includes a front panel 2 that constitutes an occupant opposed surface, and a rear panel 3 that constitutes a side (steering-wheel side) opposite from the occupant opposed surface. The front panel 2 is formed by a circular panel consisting of cloth.

The rear panel 3 has a substantially elliptic and symmetrical shape that is vertically long in such a manner that the length in the up-down direction is longer than the width in the right-left direction.

An inflator opening 5 is provided in a center portion of the rear panel 3 in the right-left direction to be slightly shifted downward from a center portion in the up-down direction. Around the inflator opening 5, small holes 6 for bolt insertion are provided. Vent holes 7 are provided apart from the inflator opening 5 by a predetermined distance. In this embodiment, two vent holes 7 are provided. The vent holes 7, 7 are located at an equal distance from the center of the inflator opening 5. The vent holes 7, 7 are respectively provided in a left half section and a right half section of the rear panel 3. A straight line that connects the vent holes 7, 7 coincides with the right-left width direction of the vehicle.

As illustrated in FIGS. 3a to 3d, the rear panel 3 is folded back along preset folding lines 11 to 16 to form first to third tuck portions 21 to 23 (FIGS. 4 to 6c), and is then sewn to the front panel 2.

A detailed description will be given below of the shape of the rear panel 3 and the folding-back method for the rear panel 3.

An outer peripheral lower edge of the rear panel 3 serves as a first arc portion 3a to be aligned with an outer peripheral lower edge 2a of the front panel 2. The first arc portion 3a is located at an equal radial distance from the center of the inflator opening 5. A lower side of an outer peripheral edge of a left side portion of the rear panel 3 serves as a second arc portion 3b, and an upper side of the outer peripheral edge serves as a third arc portion 3c. A lower side of an outer peripheral edge of a right side portion of the rear panel 3 serves as a fourth arc portion 3d, and an upper side of the outer peripheral edge serves as a fifth arc portion 3e.

An upper part of the rear panel 3 serves as an extending portion 3T extending upward, and an outer peripheral edge of the extending portion 3T serves as a sixth arc portion 3f. The curvature radius of these arc portions 3a to 3f is the same as the curvature radius of the outer peripheral edge of the front panel 2.

Short arc portions 3g, 3h are respectively provided between points A and L at left and right ends of the first arc portion 3a and points B and K at lower ends of the second and fourth arc portions 3b and 3d. Short arc portions 3i, 3j are respectively provided between points C and J at upper ends of the second and fourth arc portions 3b and 3d and points D and I at lower ends of the third and fifth arc portions 3c and 3e. Short arc portions 3m, 3n are respectively provided between points E and H at upper ends of the third and fifth arc portions 3c, 3e and points F and G at left and right ends of the sixth arc portion 3f. These short arc portions 3g to 3j, 3m, and 3n are arcs that are convex toward the outside of the rear panel 3, and the curvature radius of the short arc portions 3g to 3j, 3m, and 3n is the same as the curvature radius of the arc portions 3a to 3f.

Regarding the distances of the first to sixth arc portions 3a to 3f from the center of the inflator opening 5, the distance of the sixth arc portion 3f is the longest, the distances of the third and fifth arc portions 3c, 3e are the next longest, the distances of the second and fourth arc portions 3b, 3d are the next longest, and the distance of the first arc portion 3a is the shortest.

A straight line connecting the points C and J serves as a first preset folding line 11, and a straight line connecting the points D and I serves as a second preset folding line 12. A third preset folding line 13 is set between the points E and L, and a fourth preset folding line 14 is set between the points F and K. A fifth preset folding line 15 is set between the points A and H, and a sixth preset folding line 16 is set between the points B and G.

The third and fourth preset folding lines 13, 14 extend in parallel and toward the right lower side between the points E and F and the second preset folding line 12 and between the first preset folding line 11 and the points L and K. Between the first and second preset folding lines 11, 12, the third and fourth preset folding lines 13, 14 extend in parallel and toward the left lower side.

The fifth and sixth preset folding lines 15, 16 extend in parallel and toward the left lower side between the points G and H and the second preset folding line 12 and between the first preset folding line 11 and the points B and A. Between the first and second preset folding lines 11, 12, the fifth and sixth preset folding lines 15, 16 extend in parallel and toward the right lower side.

Figure 3A:
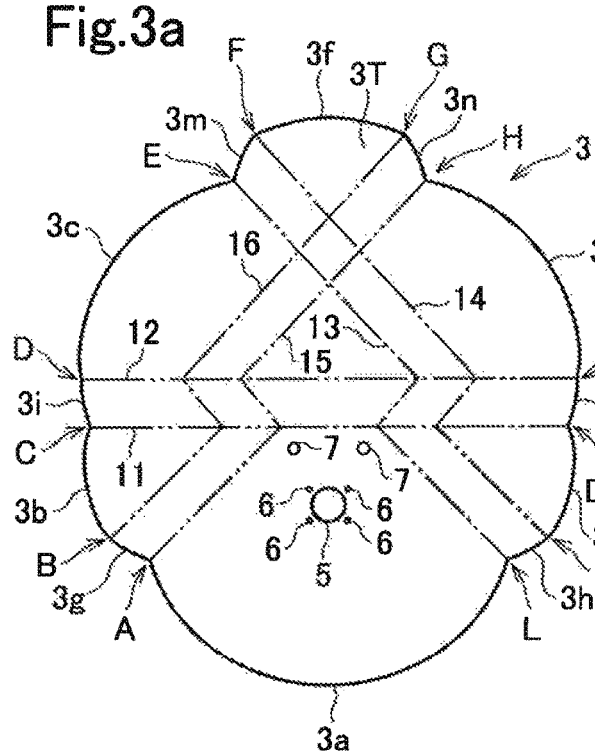
FIG. 3a is a plan view of a rear panel before folded of the driver airbag according to the embodiment.
Figure 3B:
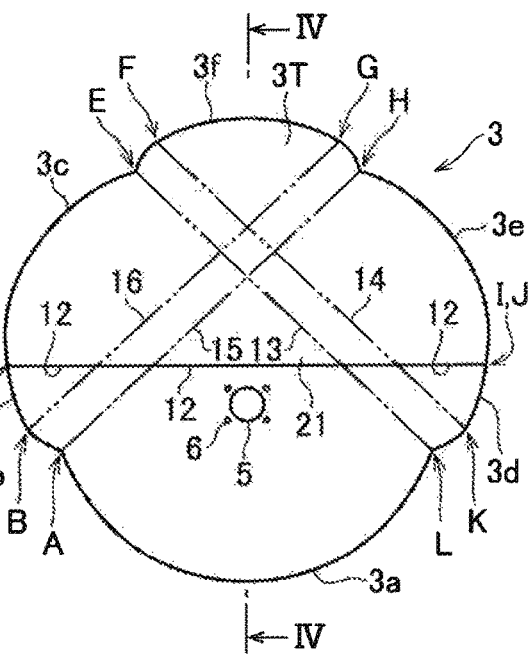
FIGS. 3b, 3c, and 3d are plan views illustrating folding of the rear panel.

As illustrated in FIG. 3b, the rear panel 3 is first valley-folded along the first preset folding line 11 and is mountain-folded along the second preset folding line 12 to form a first tuck portion 21. By this folding-back operation, the second and third arc portions 3b and 3c are connected and the fourth and fifth arc portions 3d and 3e are connected. The third to sixth preset folding lines 13 to 16 extend nearly straight, respectively, between the points E and L, between the point F and K, between the points A and H, and between the points B and G.

Figure 3C:
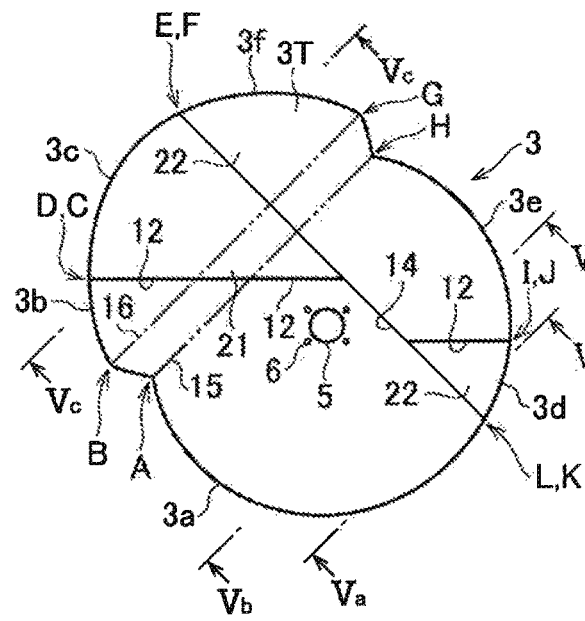

Next, as illustrated in FIG. 3c, the rear panel 3 is valley-folded along the third preset folding line 13 and is mountain-folded along the fourth preset folding line 14 to form a second tuck portion 22. By this folding-back operation, the third and sixth arc portions 3c, 3f are connected, and the first and fourth arc portions 3a, 3d are connected.

Figure 3D:
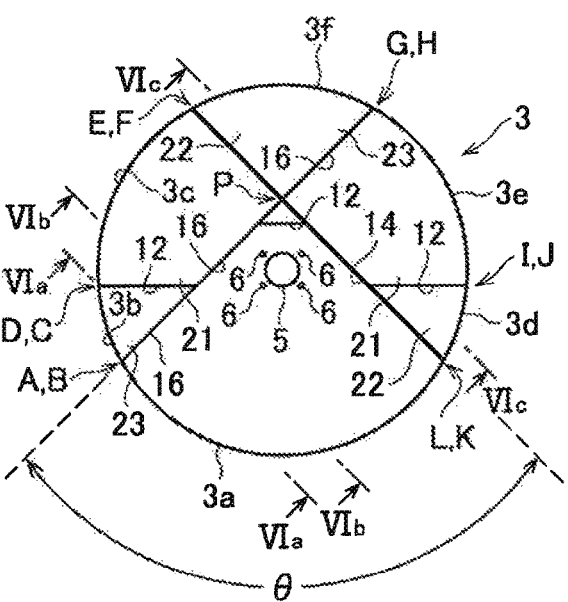
Figure 4:
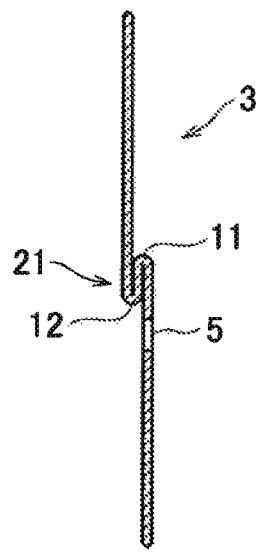
FIG. 4 is a cross-sectional view taken along line IV-IV in FIG. 3b.
Figure 5A:
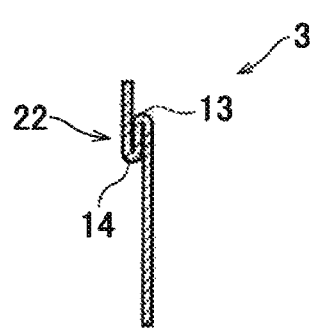
FIG. 5a is a cross-sectional view taken along line Va-Va in FIG. 3c.
Figure 5B:
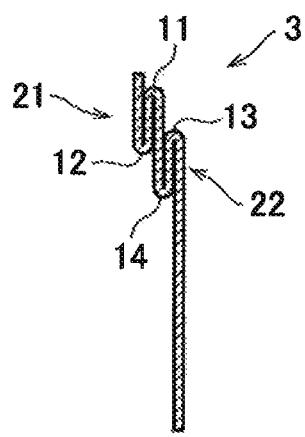
FIG. 5b is a cross-sectional view taken along line Vb-Vb in FIG. 3c.
Figure 5C:
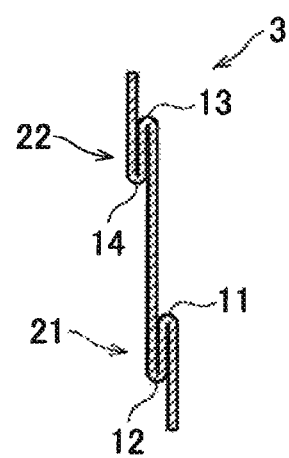
FIG. 5c is a cross-sectional view taken along line Vc-Vc in FIG. 3c.
Figure 6A:
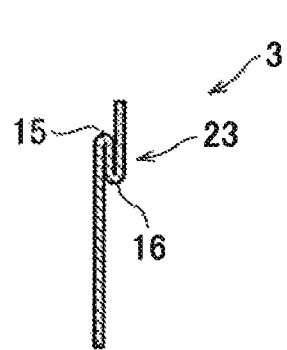
FIG. 6a is a cross-sectional view taken along line VIa-VIa in FIG. 3d.
Figure 6B:
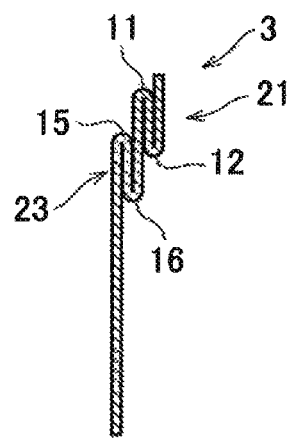
FIG. 6b is a cross-sectional view taken along line VIb-VIb in FIG. 3d.
Figure 6C:
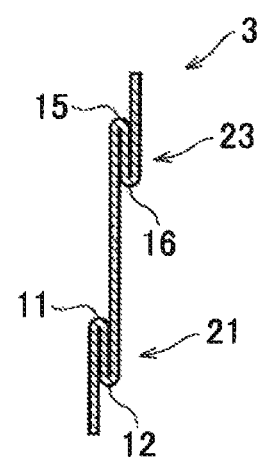
FIG. 6c is a cross-sectional view taken along line VIc-VIc in FIG. 3d.

Next, as illustrated in FIG. 3d, the rear panel 3 is valley-folded along the fifth preset folding line 15 and is mountain-folded along the sixth preset folding line 16 to form a third tuck portion 23. By this folding-back operation, the sixth and fifth arc portions 3f, 3e are connected, and the second and first arc portions 3b, 3a are connected.

As a result, all of the arc portions 3a to 3f are located on a circumference having a constant radius from the center of the rear panel 3, and the rear panel 3 is made into a circular folded shape. The diameter of the rear panel 3 having the circular folded shape illustrated in FIG. 3d is substantially equal to the diameter of the front panel 2. An intersection angle θ of the second tuck portion 22 and the third tuck portion 23 is preferably within a range of about 60° to 120°, and more particularly within a range of about 75° to 105°. An intersection point P of the second and third tuck portions 22, 23 is located at a position higher than the inflator opening 5. The distance between the intersection point P and the center of the inflator opening 5 is preferably about 20% to 70%, and more particularly about 30% to 50% of the radius of the front panel 2.

The rear panel 3 having the circular folded shape is superposed on the front panel 2 with the preset folding lines 14, 16 located on the side of the front panel 2, and the outer peripheral edge of the front panel 2 and the outer peripheral edge of the rear panel 3 having the circular folded shape are sewn with a sewing thread. Next, the front panel 2 and the rear panel 3 having the circular folded shape are reversed through the inflator opening 5, so that a driver airbag 1 is produced.

Although not illustrated, the driver airbag 1 is folded up, an inflator is attached to the opening 5, and the driver airbag 1 is attached to a retainer and is covered with a module cover, so that a driver airbag device is constituted. The driver airbag device is installed on a steering wheel 30 (FIG. 1). When the inflator starts to generate gas, the driver airbag 1 is inflated.

The rear panel 3 having the circular folded shape in the driver airbag 1 has the first to third tuck portions 21 to 23. Since a part of the first tuck portion 21 and most of the second and third tuck portions 22, 23 are located in an upper half section of the driver airbag 1 (on an upper side of the inflator opening 5), as illustrated in FIG. 1, the upper part of the driver airbag 1 in a final deployed state is has a larger thickness than that of the lower part. For this reason, the occupant opposed surface of the driver airbag 1, particularly, a surface for receiving the vicinity of the head of an occupant 40 is substantially vertical.

The thickness and width of the upper part of the driver airbag 1 in a final deployed state can be adjusted by the intersection angle θ of the second tuck portion 22 and the third tuck portion 23. As the intersection angle θ decreases, the thickness of the upper part in a final deployed state increases and the width decreases. In contrast, as the intersection angle θ increases, the thickness of the upper part in a final deployed state decreases and the width increases.

The above-described embodiment is just an example of the present invention, and the present invention may adopt embodiments other than the illustrated one. For example, the first tuck portion 21 may include two or more tucks. Each of the second and third tuck portions 22 and 23 may also include two or more tucks. The tuck portions may be disposed only in the upper part of the rear panel 3. The second and third tuck portions 22 and 23 do not always need to intersect each other.

In the present invention, a tether may be provided to connect the front panel and the steering wheel.

The invention claimed is:

1. A driver airbag comprising a front panel and a rear panel connected at peripheral edges thereof,
   the rear panel including a tuck portion,
   the tuck portion being disposed only in an upper part of the rear panel, or more tuck portions being disposed in the upper part of the rear panel than in a lower part of the rear panel,
   the tuck portion is formed by folding the rear panel and does not include the front panel,
   wherein the tuck portions include a first tuck portion extending in a right-left direction, a second tuck portion extending from a right upper side toward a left lower side, and a third tuck portion extending from a left upper side toward a right lower side.

2. The driver airbag according to claim 1, wherein the second tuck portion and the third tuck portion intersect in an upper half section of the rear panel.

3. A driver airbag device comprising the driver airbag according to claim 1 and an inflator that inflates the driver airbag.

4. A driver airbag comprising a front panel and a rear panel connected at peripheral edges thereof,
   the rear panel including a tuck portion, and
   the tuck portion being disposed only in an upper part of the rear panel, or the tuck including more tuck portions disposed in the upper part of the rear panel than in a lower part of the rear panel,
   wherein the tuck portion includes a first tuck portion extending in a right-left direction, a second tuck portion extending from a right upper side toward a left lower side, and a third tuck portion extending from a left upper side toward a right lower side,
   wherein the second tuck portion and the third tuck portion intersect in an upper half section of the rear panel,
   wherein the rear panel has a substantially elliptic and symmetrical shape that is vertically long in such a manner that the length in an up-down direction is longer than the width in the right-left direction, and
   wherein an inflator opening is provided in a center portion of the rear panel.

5. The driver airbag according to claim 4, wherein an outer peripheral lower edge of the rear panel serves as a first arc portion to be aligned with an outer peripheral lower edge of the front panel,
   a lower side of an outer peripheral edge of a left side portion of the rear panel serves as a second arc portion,
   an upper side of the outer peripheral edge of the left side portion of the rear panel serves as a third arc portion,
   a lower side of an outer peripheral edge of a right side portion of the rear panel serves as a fourth arc portion,
   an upper side of the outer peripheral edge of the right side portion of the rear panel serves as a fifth arc portion,
   an upper part of the rear panel serves as an extending portion extending upward, and an outer peripheral edge of the extending portion serves as a sixth arc portion,
   the first arc portion has both end points A, L,
   the second arc portion has a lower end point B and an upper point C,
   the fourth arc portion has a lower end point K and an upper end point J,
   the third arc portion has a lower end point D and an upper end point E,
   the fifth arc portion has a lower end point I and an upper end point H, and
   the sixth arc portion has both end points F, G.

6. The driver airbag according to claim 5, wherein a straight line connecting the points C and J is a first preset folding line,
   a straight line connecting the points D and I is a second preset folding line,
   as a third preset folding line is provided between the points E and L,
   a fourth preset folding line is provided between the points F and K,
   a fifth preset folding line is provided between the points A and H,
   a sixth preset folding line is provided between the points B and G, and
   wherein the rear panel is folded along the first to sixth folding lines.

7. The driver airbag according to claim 6, wherein the third and fourth preset folding lines extend in parallel and toward the right lower side between the points E, F and the second preset folding line and between the first preset folding line and the points L, K,
   the third and fourth preset folding lines extend in parallel and toward the left lower side between the first and second preset folding lines,
   the fifth and sixth preset folding lines extend in parallel and toward the left lower side between the points G, H and the second preset folding line and between the first preset folding line and the points B, A, and
   the fifth and sixth preset folding lines extend in parallel and toward the right lower side between the first and second preset folding lines.

8. The driver airbag according to claim 7, wherein the rear panel is first valley-folded along the first preset folding line and is mountain-folded along the second preset folding line to form the first tuck portion, whereby the second and third arc portions are connected and the fourth and fifth arc portions are connected, the third to sixth preset folding lines extend nearly straight, respectively, between the points E and L, between the point F and K, between the points A and H, and between the points B and G,
   wherein the rear panel is valley-folded along the third preset folding line and is mountain-folded along the fourth preset folding line to form the second tuck portion, whereby the third and sixth arc portions are connected, and the first and fourth arc portions are connected, and
   wherein the rear panel is valley-folded along the fifth preset folding line and is mountain-folded along the sixth preset folding line to form the third tuck portion, whereby the sixth and fifth arc portions are connected, and the second and first arc portions are connected, so that all of the arc portions are located on a circumference having a constant radius from the center of the rear panel, and the rear panel is made into a circular folded shape.

9. The driver airbag according to claim 8, wherein the diameter of the rear panel having the circular folded shape is substantially equal to the diameter of the front panel.

10. The driver airbag according to claim 9, wherein an intersection angle θ of the second tuck portion and the third tuck portion is within a range of about 60° to 120°.

11. The driver airbag according to claim 10, wherein an intersection point P of the second tuck portion and the third tuck portion is located at a position higher than the inflator opening.

12. The driver airbag according to claim 11, wherein the rear panel having the circular folded shape is superposed on the front panel, the preset folding lines are opposed to the front panel, and the outer peripheral edge of the front panel and an outer peripheral edge of the rear panel having the folded shape are sewn with a sewing thread, and the front panel and the rear panel having the folded shape are reversed through the inflator opening, so that a driver airbag is produced.

13. A driver airbag device comprising the driver airbag according to claim 4 and an inflator that inflates the driver airbag.

\* \* \* \* \*